United States Patent
Kachouh et al.

(10) Patent No.: US 7,261,013 B2
(45) Date of Patent: Aug. 28, 2007

(54) MOTORIZED MOTOR VEHICLE COMPONENT

(75) Inventors: Checrallah Kachouh, Dortmund (DE); Markus Kothe, Velbert (DE)

(73) Assignee: Brose Schliesssysteme GmbH & Co. KG, Wuppertal (DE)

( * ) Notice: Subject to any disclaimer, the term of this patent is extended or adjusted under 35 U.S.C. 154(b) by 270 days.

(21) Appl. No.: 11/143,932

(22) Filed: Jun. 3, 2005

(65) Prior Publication Data

US 2005/0284201 A1    Dec. 29, 2005

(30) Foreign Application Priority Data

Jun. 4, 2004    (DE) .................... 10 2004 027 420

(51) Int. Cl.
*F16H 1/16*    (2006.01)
(52) U.S. Cl. ..................... 74/425; 292/201; 49/280
(58) Field of Classification Search ............. 292/201; 49/280; 74/425, 89.2, 89.22
See application file for complete search history.

(56) References Cited

U.S. PATENT DOCUMENTS

| 5,348,357 | A |  | 9/1994 | Konchan et al. |
| 5,938,253 | A |  | 8/1999 | Szablewski et al. |
| 6,182,527 | B1 |  | 2/2001 | Sander |
| 6,390,517 | B1 | * | 5/2002 | Ehret .................... 292/201 |
| 6,409,238 | B1 |  | 6/2002 | Mikenis et al. |
| 6,676,556 | B2 | * | 1/2004 | Ishihara et al. ............. 475/269 |
| 2001/0010427 | A1 | * | 8/2001 | Roos ......................... 292/201 |
| 2006/0075841 | A1 | * | 4/2006 | Kachouh et al. ............. 74/425 |

* cited by examiner

*Primary Examiner*—Gary Estremsky
(74) *Attorney, Agent, or Firm*—David S. Safran (57) ABSTRACT

A motor vehicle component with a drive having a motor, a gearing and a component which is movable by the drive, the motor being coupled to a driving side of the gearing and a driven side of the gearing being coupled to the movable component, a kinematic chain of the gearing between the driving side and the driven side having at least two transmission elements. The drive is operable in blocking operation by a displaceable blocking element that is movable into blocking engagement with the drive. The displaceable blocking element is in addition to the drive and the adjustable component, and is engaged in a controlling manner with the first transmission element of the kinematic chain so that, depending on the position of a first transmission element, it can be moved into blocking engagement with a second transmission element of the kinematic chain.

21 Claims, 6 Drawing Sheets

MOTORIZED MOTOR VEHICLE COMPONENT

BACKGROUND OF THE INVENTION

1. Field of Invention

This invention relates to a motorized motor vehicle component with a drive having a motor and gearing and with a component which can be moved by means of the drive, the gearing having a drive side and a driven side, the motor being coupled to the driving side of the gearing and the driven side of the gearing being coupled to the movable component, the kinematic chain of the gearing, between the driving side and the driven side, having at least two transmission elements and the drive being operable in a blocking operation, and for this reason, an displaceable blocking element is movable into blocking engagement with the drive.

Here, the expression "motorized motor vehicle component" encompasses all those components of a motor vehicle which provide functions which can be triggered by a motor. Examples of functions which can be triggered by a motor include the central locking system, opening aid, closing aid or the mechanical redundancy of a motor vehicle door lock. Furthermore, motorized motor vehicle components from other areas are also encompassed, such as, for example, the motorized actuating means of the hatch, door or sliding door, the motorized seat or seat height adjustment, or the motorized window raiser of a motor vehicle.

2. Description of Related Art

All motorized motor vehicle components have some kind of drive for executing the function which can be triggered by a motor—therefore for actuation of an adjustable component—, the drive in turn being composed, in any case, of a motor and gearing which is connected downstream of the motor.

It is important for reliable operation of the motorized motor vehicle component that the motor with the corresponding control of motion starts the mechanical states of the drive which are required at the time as reliably as possible.

In the case of an electric motor, one possibility for controlling motion involves short-circuiting the motor briefly before reaching the desired position—dynamic braking. The disadvantage in this approach is that, generally, sensors for determining the prevailing motor position are necessary and that reliability is subject to major fluctuations depending on the respective temperature.

Another possibility is to allow the drive to run against a stop when the desired position has been reached, so that the motor, after a predetermined time interval, or after detection of an overcurrent, can be turned off by the coordinating control—blocking operation.

The known motor vehicle component which underlies this invention (U.S. Pat. No. 5,938,253) shows one possible implementation of the above described blocking operation using a motorized opening aid function for a motor vehicle door lock. In this case, the motor vehicle door lock has a latch and a ratchet which keeps the latch in the closed position, and the ratchet can be raised by means of a drive into the position which releases the latch. For this purpose, the drive has an actuating element with a driver pin which presses the ratchet into its raised position in an actuating process. Toward the end of the actuating process, the driver pin engages the ratchet such that the motor of the drive is blocked by the ratchet, the motor current rises measurably and after a certain delay time, the motor is turned off. Here, the ratchet, therefore the adjustable component, with motion which is to be controlled by the drive, itself, forms an displaceable blocking element which is necessary for blocking operation. This fact alone leads to undesirable structural limitations in the implementation of the ratchet. It is especially disadvantageous in this respect if it is considered that, for the required high raising speeds of the ratchet, what is important is especially the optimum matching between the reset spring force which acts on the ratchet and the ratchet weight as well as the corresponding weight distribution. However, these structural boundary conditions are disadvantageous also with respect to the continuing demand to increase compactness of motorized motor vehicle components.

Finally the known construction is disadvantageous in that the high blocking force or the high blocking moment leads to undesirable striking noise which is generally considered to be disturbing. Furthermore, the high blocking force leads to the material of the actuating element and the ratchet, as well as the corresponding gears, having to be made especially rigid. This imposes a further undesirable structural limitation.

SUMMARY OF THE INVENTION

A primary object of this invention is to embody and develop the known motorized motor vehicle component such that the structural limitations for implementation are minimized, with a simultaneous increase in efficiency.

This object is achieved in a motor vehicle door lock of the initially mentioned type in which there is an displaceable blocking element in addition to the drive and the adjustable component, the blocking element being engaged in a controlling manner with a first transmission element of the kinematic chain, and in this way, depending on the position of the first transmission element can be moved into blocking engagement with a second transmission element of the kinematic chain.

First of all, it is important that there is an displaceable blocking element in addition to the drive and the movable component. Here, "additional" means that the blocking element is expressly not a component of the drive or of the movable component, so that the drive and the movable component can be engineered independently of the blocking element, in any case in a wide range.

This additionally provided blocking element, at this point, is engaged in a controlling manner with the first transmission element of the kinematic chain of the gearing, by which the blocking element can be moved to engage the second transmission element of the kinematic chain of the gearing in a blocking manner. Thus, on the one hand, it is possible by suitable selection of the first transmission element to ensure optimum control of the blocking element for reliable and prompt assumption of the blocking position. On the other hand, suitable selection of the second transmission element ensures an optimum blocking action. Generally, it can be considered optimum if the first transmission element is exposed to a comparatively high torque in order to ensure the motion of the blocking element, and if the second transmission element is exposed to a comparatively low torque so that the resulting blocking moment and the resulting blocking force are low. This leads to a low striking noise and the possibility of a "low strength" design of the corresponding mechanical components.

An optimum design with respect to control and blocking forces is achieved by the pivot axle or axis of rotation of the blocking element being parallel to the pivot axis or axes of rotation of the first and second transmission element. Such a configuration of the control contour leads to optimum lever ratios for a control force which is as high as possible. Alternatively, by making the first transmission element essentially disk-shaped and arranging the control contour on the face as near as possible to the axis of rotation of the first transmission element the arrangement of the stop as far outside as possible on the second transmission element guarantees a low blocking force.

It should be expressly pointed out here that the approach of the invention is intended for all conceivable motorized motor vehicle components, examples of which were cited at the beginning.

The invention is explained in detail below with reference to the accompanying drawings which show embodiments of the invention.

DETAILED DESCRIPTION OF THE INVENTION

Figure 1:
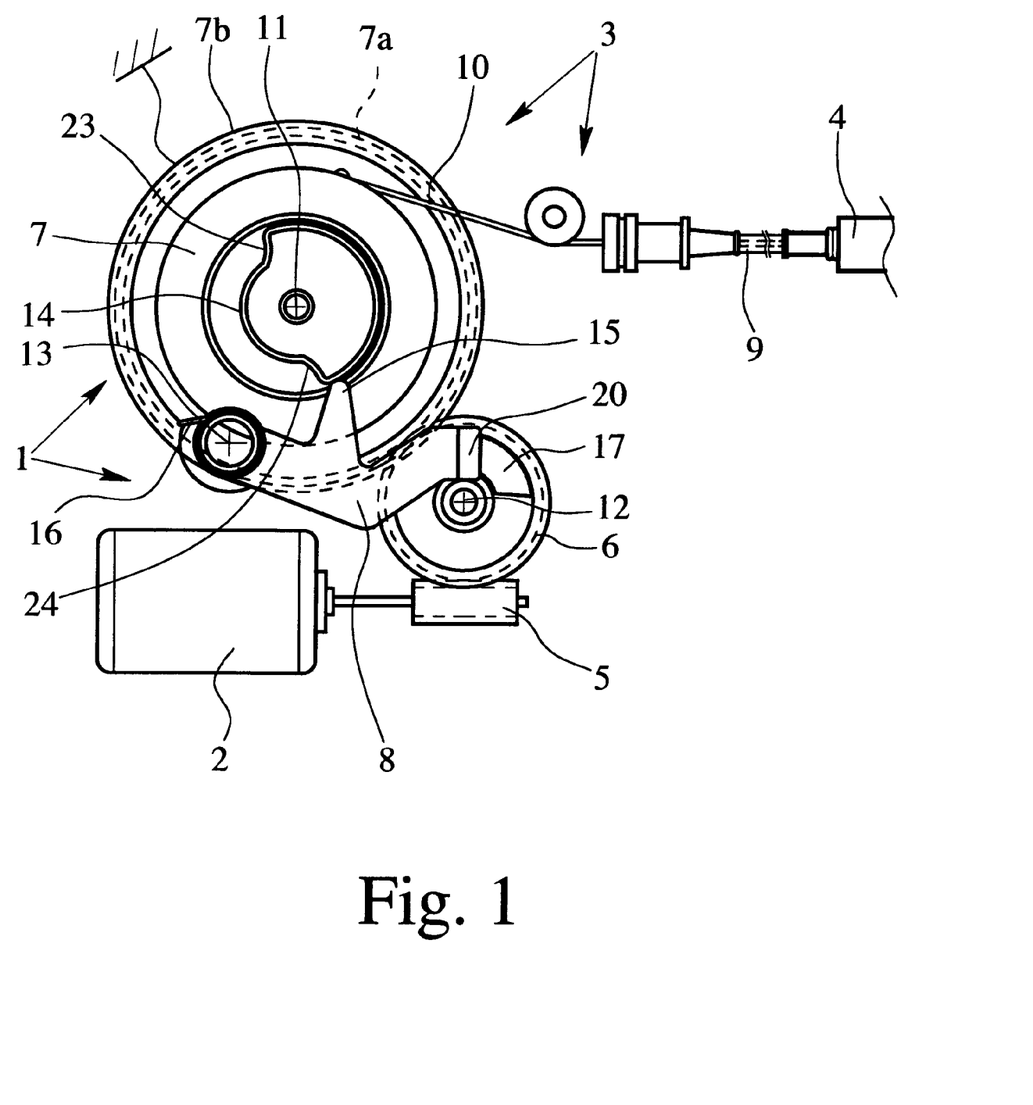
FIG. 1 is a plan view of a motorized motor vehicle component in a first blocking position.

The motorized motor vehicle component which is shown in FIG. 1 comprises a drive 1 having a motor 2 and gearing 3, and a component 4 which can be moved by means of the drive 1. The gearing 3, as is conventional, has a drive side and a driven side, the motor 2 being coupled by to the driving side of the gearing 3. The driven side of the gearing 3 is coupled to the movable component 4. By linking the motor 2 via the gearing 3 to the movable component 4, the movable component 4 can be driven according to its functionality.

Depending on which functionality is to be provided by the motor vehicle component, the movable component 4 is a lever, another gear, or the like. Numerous versions of such components are known from the prior art and any of which are contemplated as being usable in accordance with the present invention.

In this embodiment, the kinematic chain of the gearing 3 runs from the worm 5 which is connected to the motor 2, via the worm wheel 6, then via a sun wheel 7a as far as a planet carrier 7 of a planet gear. The planet gear has a stationary ring gear 7b. The planet carrier 7, to a certain extent, places in readiness the driven side of the gearing 3 and is also designated the actuating element 7 below.

Therefore, kinematic chain of the gearing 3 has four transmission elements, i.e., the worm 5, the worm wheel 6, the sun wheel 7a and the planet carrier 7. Depending on the prevailing boundary conditions, it can also be advantageous to provide only two transmission elements, or more than four transmission elements. These boundary conditions are dictated essentially by the movable component 4.

Furthermore, an displaceable blocking element 8 is provided which can be moved into blocking engagement with the drive 1. In this way, the drive 1 can be operated in blocking operation.

In this embodiment, the movable component 4 is coupled with to the driven side of the gearing 3a via the core 10 of a Bowden cable 9. The core 10 is wound onto and unwound from the actuating element 7. However, it is pointed out that numerous versions are known from the prior art for coupling the movable component 4 to the driven side of the gearing 3 so that the invention should not be viewed as limited to this manner of coupling.

FIG. 1 shows that the blocking element 8, in the aforementioned sense, is made as an "additional" blocking element with the indicated resulting advantages. FIG. 1 shows especially clearly that the configuration of the movable component 4 is completely independent of the structural execution of blocking operation. Furthermore, it is noted that there is an especially great construction latitude in the implementation of the blocking element 8 itself since, at this point, it can be freely selected at which points of the drive 1 the blocking element 8 is to be able to be moved into controlling and blocking engagement.

The aforementioned advantages can be fully exploited when, as is shown in the illustrated embodiment, the blocking element 8 is engaged in a controlling manner to the first transmission element 7 of the kinematic chain of the gearing 3, and in this way, depending on the position of the first transmission element 7, can be moved into blocking engagement with the second transmission element 6 of the kinematic chain. In the illustrated and especially preferred embodiment, the first, controlling, transmission element is the actuating element 7, while the second, blocking, transmission element is the worm wheel 6.

With the above described concept it is possible in the engineering to, first of all, identify the transmission elements as optimum first and second transmission elements in the aforementioned sense, and finally, to design the blocking element 8 as an "additional" blocking element 8.

It is especially advantageous if the transmission elements of the gearing 3 are made such that the torque on the second blocking transmission element 6 is comparatively small, and in this way, the resulting blocking moment is accordingly likewise small. In this embodiment, this torque can be varied over the diameter of the worm wheel 6. The indication "comparatively small" should be understood here as relative to the other transmission elements of the gearing 3.

The reverse applies to the first transmission element 7 which is engaged in a controlling manner to the blocking element 8. Here, it is especially advantageous if the torque on the transmission element 7 is comparatively large in order to guarantee reliable and prompt displacement of the blocking element 8.

For gearing 3, which steps up the torque, this optimally means that the first transmission element 7 is coupled essentially directly to the movable component 4 and the second transmission element 6 is coupled essentially directly to the motor 2. This means that the first transmission element 7 is exposed to torque which is as high as possible and the second transmission element 6 is exposed to torque which is as low as possible. This leads to the aforementioned advantages.

The first transmission element 7, on the one hand, and the second transmission element 6, on the other hand, in the illustrated preferred embodiment are made to be able to turn around the axes of rotation 11, 12, the two axes of rotation 11, 12 being aligned, preferably parallel to one another. This leads to an especially compact arrangement. The two transmission elements 6, 7 can also be simply pivoting levers or the like.

The blocking element 8 is made to be able to pivot around a pivot axis 13, but it can also be advantageous to make the blocking element 8 able to rotate around an axis of rotation.

An especially compact arrangement arises when all pivot axes and axes of rotation 11, 12, 13 of the transmission elements 6, 7 and of the blocking element 8 are aligned parallel to one another. In particular, a very flat arrangement can be achieved in this way.

The first transmission element 7, therefore the actuating element 7 here, has a control contour 14 which is engaged in a controlling manner to the blocking element 8. For this reason, the blocking element 8 is equipped with a feeler projection 15. In one preferred configuration, the blocking element 8 is spring-loaded such that the feeler projection 15 is pressed against the control contour 14. In this embodiment, there is a spring 16 for this purpose.

While in this embodiment the actuating element 7 is essentially disk-shaped, the control contour 14 being arranged on the face, it can also be advantageous for the first transmission element 7 to be made roller-shaped or the like with an optionally likewise face-side control contour.

In order to achieve control of the adjustment of the blocking element 8 which is as reliable as possible, the control contour 14 is located as near as possible to the axis of rotation 11 of the first transmission element 7. This leads to optimum lever ratios in the controlling transmission of force from the first transmission element 7 to the blocking element 8.

Therefore, the second transmission element 6, here the worm wheel 6, has a stop 17 with stop surfaces 18, 19 which, for blocking operation, can be moved into blocking engagement with the opposing stop 20 which is located on the blocking element 8 with the corresponding opposing stop surfaces 21, 22.

Figure 2:
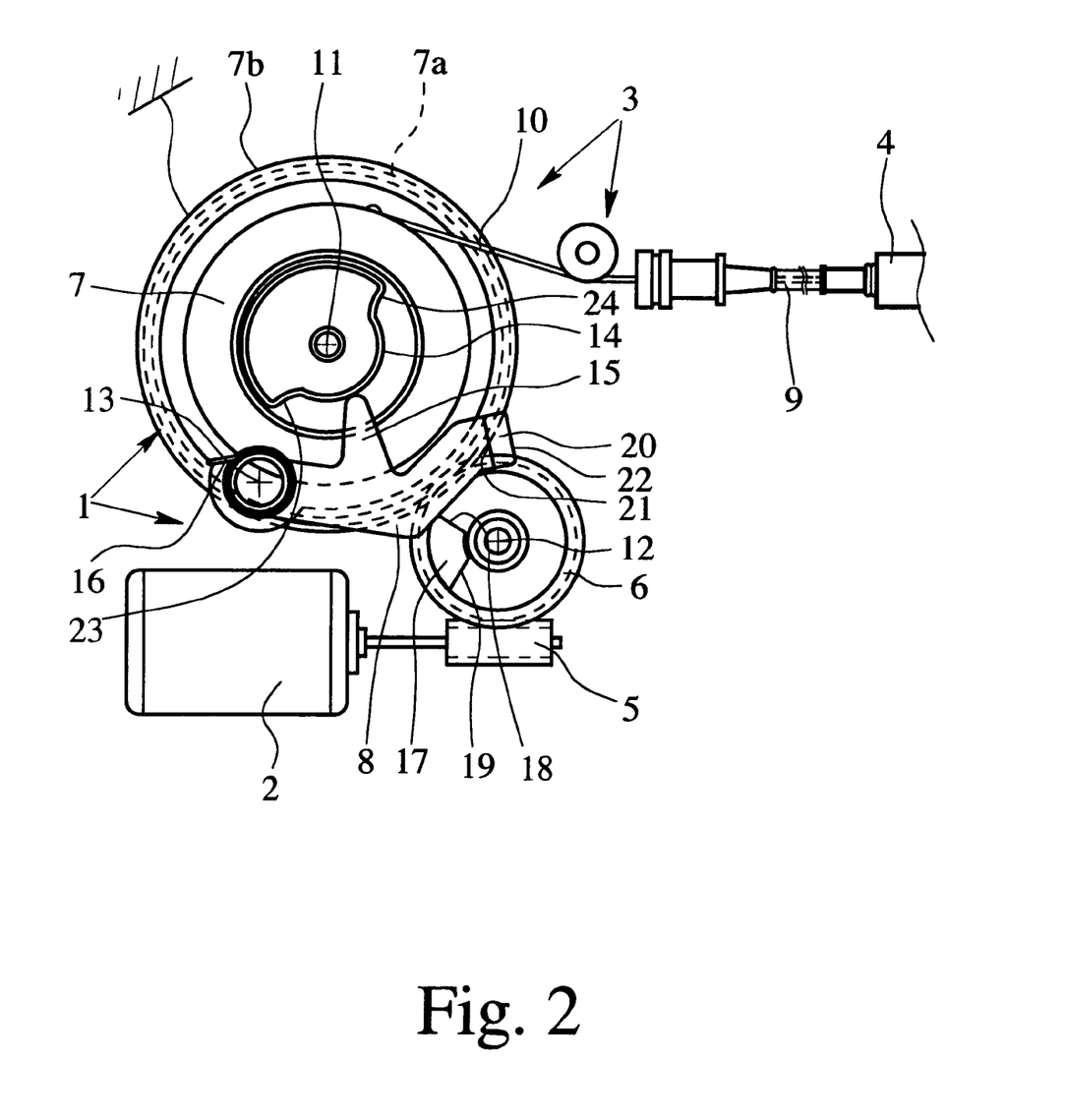
FIG. 2 shows the motor vehicle component of FIG. 1 in the non-blocking state.

The sequence of movements of this motor vehicle component can be illustrated proceeding from FIG. 2. First of all, it must be stated that this motor vehicle component, in normal operation, can be moved into two end states which can be reached by the bidirectional triggering of the motor 2.

FIG. 2 shows an intermediate position in which the core 10 of the Bowden cable 9 is wound or unwound. If, at this point, proceeding from FIG. 2, the worm wheel 6 is driven to the right by the motor 2, the actuating element 7 turns to the left. The control contour 14 runs, in this case, along the feeler projection 15 of the blocking element 8 until the first flank 23 of the control contour 14 reaches the feeler projection 15 and moves the blocking element 8 to the right. In this way, the first opposing stop surface 21 of the blocking element 8 travels into the path of motion of the first stop surface 18 of the worm wheel 6. Thus, the end state of the motor vehicle component in blocking operation is reached (FIG. 3).

Figure 3:
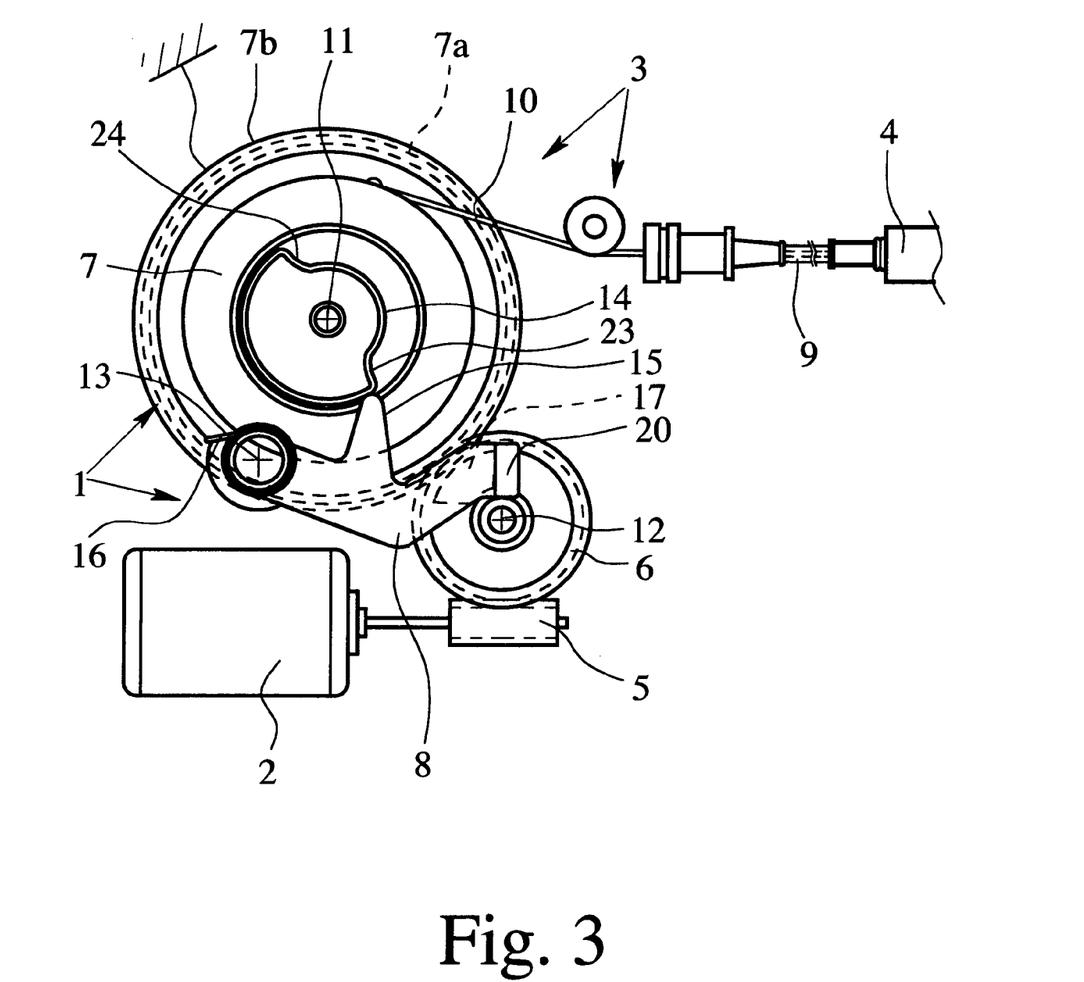
FIG. 3 shows the motor vehicle component of FIG. 1 in a second blocking position.

If, at this point, the worm wheel 6, proceeding from the end state which is shown in FIG. 3, is driven by the motor 2 to the left, the actuating element 7 turns to the right and the blocking element 8 is again moved out of the blocking position as soon as the first flank 23 of the control contour 14 has passed the feeler projection 15 of the blocking element 8. Finally, the second flank 24 of the control contour 14 engages the feeler projection 15 of the blocking element 8 and presses the second, opposing stop surface 22 of the blocking element 8 into the path of motion of the second stop surface 19 of the worm wheel 6. In this way, the drive 1 is in turn blocked and the other end state of the motor vehicle component is reached (FIG. 1).

In the drawings, there is a special configuration of the stop 17 which is located on the worm wheel 6 such that the stop 17 is located as far as possible outside on the face of the essentially disk-shaped worm wheel 6. This is a measure to minimize the blocking force as much as possible.

Figure 4:
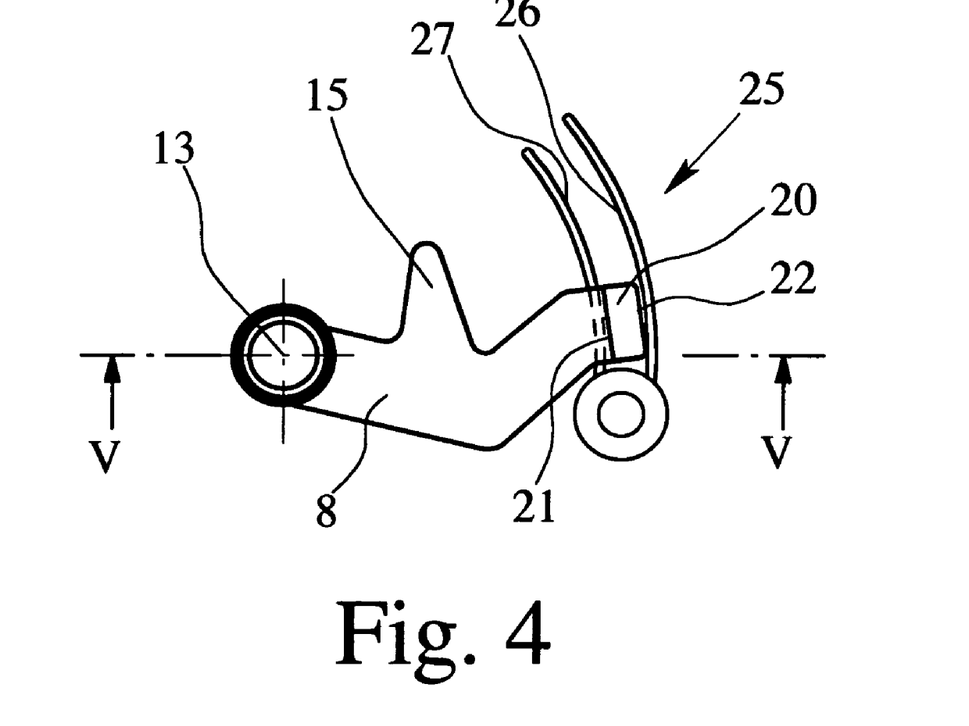
FIG. 4 is an elevational view of the blocking element of the FIG. 1 motor vehicle component with a guide of the opposing stop.
Figure 5:
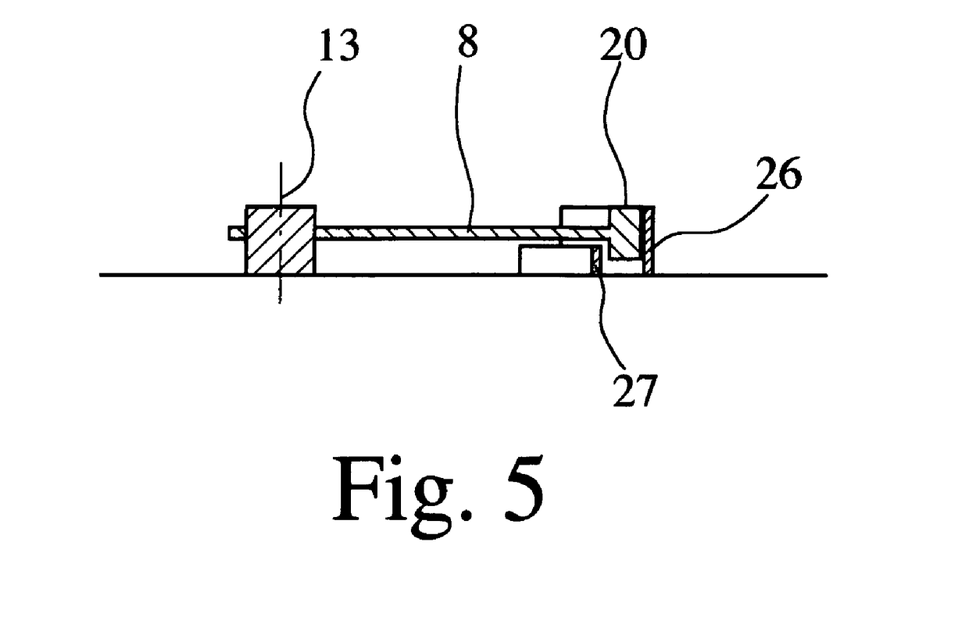
FIG. 5 is a sectional view along line V-V in FIG. 4.

Another especially advantageous configuration of the motor vehicle component is shown in FIGS. 4 & 5. FIG. 4 shows a guide 25 with guide surfaces 26, 27 in which the opposing stop 20 is guided, preferably only after adjustment of the blocking element 8 into the blocking position. This results in that the blocking force, in any case, is partially accommodated by the guide 25 and not otherwise by the blocking element 8. This can result in that the blocking element 8 can be made especially "weak". In an especially preferred configuration, the guide 25 accommodates essentially the entire blocking force via the opposing stop 20 of the blocking element 8. FIG. 5 shows a side view of these guides.

Figure 6:
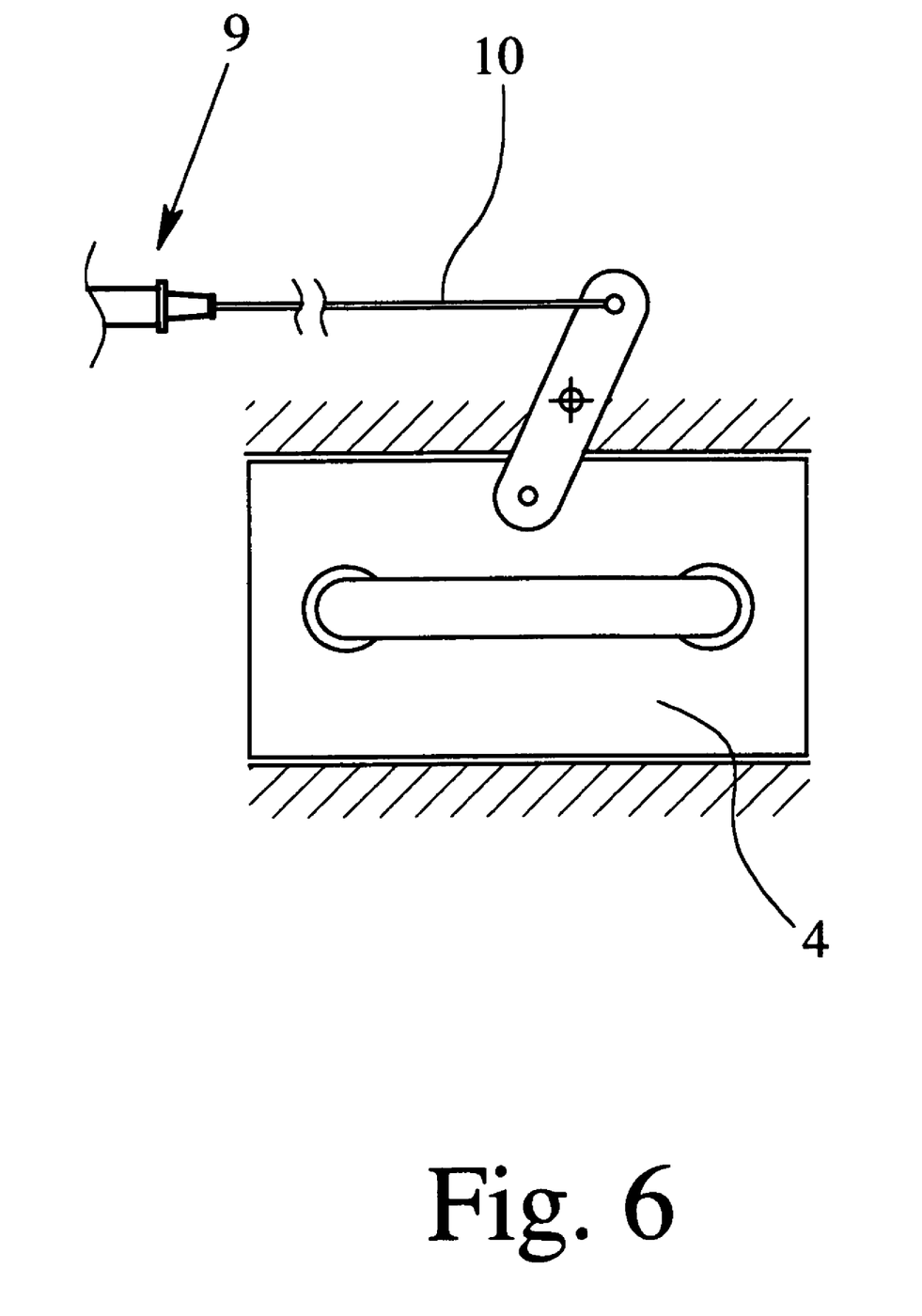
FIG. 6 shows a movable part of the motorized motor vehicle component made as a locking clip.
Figure 7:
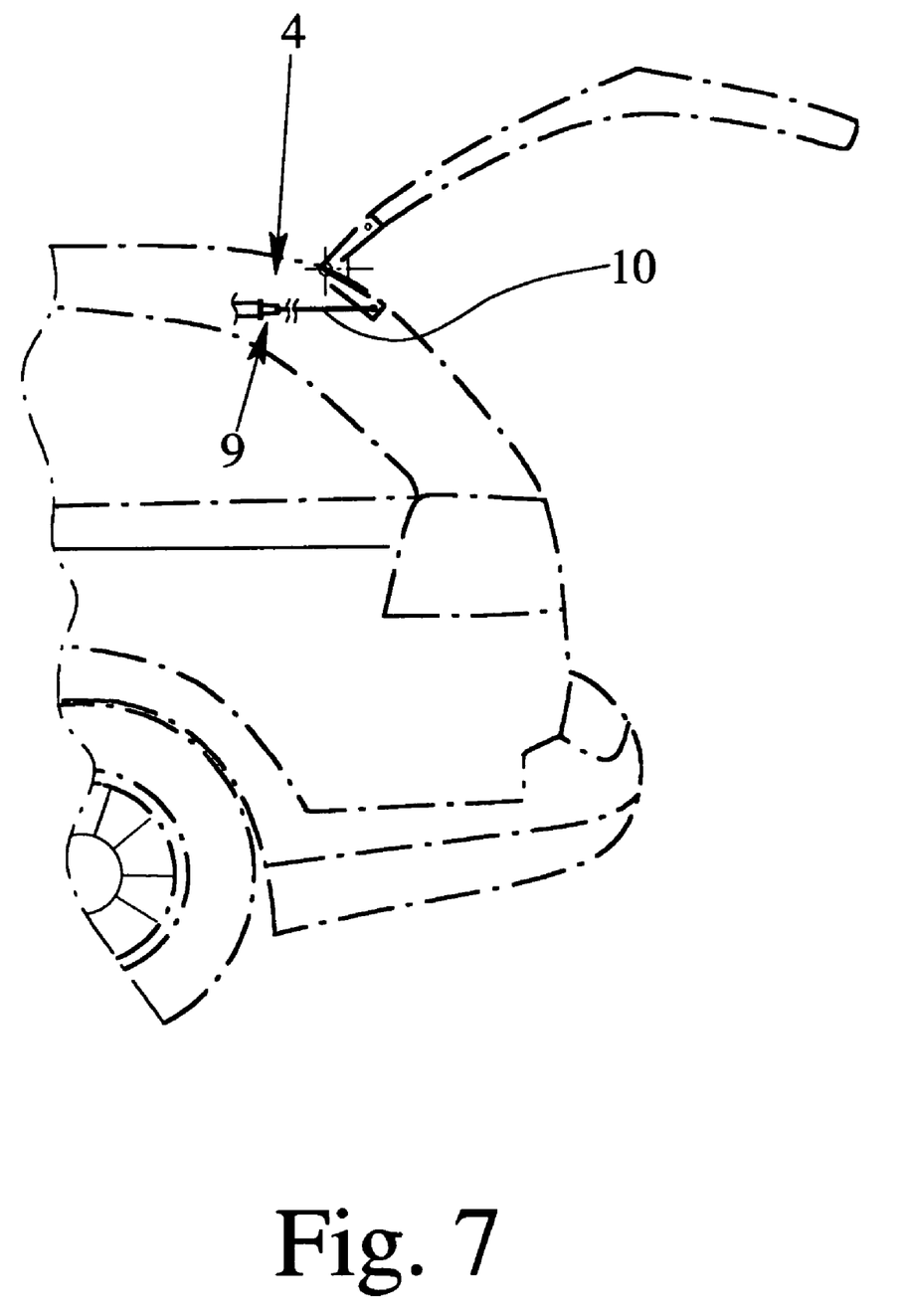
FIG. 7 shows the movable part of the motorized motor vehicle component used as the drive element of a motor driven motor vehicle hatch.

It has already been pointed out that the invention relates to all conceivable motorized motor vehicle components. Against this background, the movable component 4 can be, for example, the adjustable striker or locking clip or the adjustable latch of the closing aid of a motor vehicle door lock (FIG. 6), the central locking lever of the central locking system of a motor vehicle door lock, or the ratchet of the motor vehicle door lock. Furthermore, it is possible for the movable component 4 to be the control element of the mechanical redundancy of an electric lock, the drive element of a motor vehicle door or hatch which is driven by a motor (FIG. 7), or a clutch element between two or more motor vehicle modules. In the latter case, for example, it can be that one of the motor vehicle modules is a drive which can be switched to several "consumers" by way of the clutch element. These consumers are, for example, the window raiser or the motorized hatch actuation of a motor vehicle.

The movable component 4 can finally be a driving or control element of a window raiser which is driven by a motor or a seat or seat height adjustment which is driven by a motor.

It should be pointed out that all the aforementioned exemplary explanations should not be understood to be limiting. For example, the expression "motor vehicle door" encompasses all conceivable types of motor vehicle doors, also sliding doors.

What is claimed is:
1. Motor vehicle component, comprising:
   a drive having a motor and a gearing, the gearing having a drive side, a driven side, and a kinematic chain between the drive side and the driven side which has at least two transmission elements, the drive side of the gearing being coupled to the motor,
   a movable component which is in driven connection to the driven side of the gearing, and
   a displaceable blocking element which is mounted for movement into and out of blocking engagement with the drive,
   wherein the displaceable blocking element is in addition to the drive and the adjustable component, the blocking element being engaged in a controlling manner with a first transmission element of the kinematic chain so as to be moved into and out of blocking engagement with a second transmission element of the kinematic chain depending on the position of the first transmission element.

2. Motor vehicle component as claimed in claim 1, wherein the gearing has a worm wheel gearing stage and a planet gear stage which is connected downstream of the worm wheel gearing stage, wherein the first transmission element is a planet carrier of the planet gear stage and wherein the second transmission element is a worm wheel of the worm wheel gear stage.

3. Motor vehicle component as claimed in claim 1, wherein the transmission elements are made such that the torque on the second transmission element is comparatively small relative to the torque on the first transmission element so that a resulting blocking moment is also relatively small.

4. Motor vehicle component as claimed in claim 2, wherein the transmission elements are made such that the torque on the second transmission element is comparatively small relative to the torque on the first transmission element so that a resulting blocking moment is also relatively small.

5. Motor vehicle component as claimed in claim 1, wherein the transmission elements are made such that the torque on the first transmission element is comparatively large relative to the torque on the second transmission element.

6. Motor vehicle component as claimed in claim 1, wherein the first transmission element is coupled essentially directly to the movable component and the second transmission element is coupled essentially directly to the motor.

7. Motor vehicle component as claimed in claim 1, wherein the first transmission element and the second transmission element are each able to pivot or turn around a respective axis.

8. Motor vehicle component as claimed in claim 7, wherein said axes are aligned parallel to one another.

9. Motor vehicle component as claimed in claim 1, wherein the blocking element is able to pivot or turn around an axis of rotation.

10. Motor vehicle component as claimed in claim 7, wherein the blocking element is able to pivot or turn around an axis of rotation which is parallel to the axes of the first and second transmission element.

11. Motor vehicle component as claimed in claim 1, wherein the first transmission element has a control contour which is engaged in a controlling manner by the blocking element.

12. Motor vehicle component as claimed in claim 11, wherein the blocking element is spring-loaded in a direction for engagement with the control contour.

13. Motor vehicle component as claimed in claim 11, wherein the first transmission element is essentially disk-shaped and is able to pivot or turn around an axis; and wherein the control contour is arranged on a face thereof as near as possible to said axis of the first transmission element.

14. Motor vehicle component as claimed in claim 1, wherein the second transmission element has at least one stop which, for blocking operation, is movable into blocking engagement with an opposing stop on the blocking element.

15. Motor vehicle component as claimed in claim 3, wherein the second transmission element has at least one stop which, for blocking operation, is movable into blocking engagement with an opposing stop on the blocking element.

16. Motor vehicle component as claimed in claim 14, wherein the second transmission element is essentially disk-shaped and wherein the stop of the second transmission element is located on a face thereof as far to the outside as possible.

17. Motor vehicle component as claimed in claim 3, wherein the second transmission element is essentially disk-shaped and wherein the stop of the second transmission element is located on a face thereof as far to the outside as possible.

18. Motor vehicle component as claimed in claim 14, wherein a guide is provided for an opposing stop of the blocking element for accommodating the blocking force.

19. Motor vehicle component as claimed in claim 18, wherein the guide is made such that it accommodates essentially all of the blocking force applied by the opposing stop.

20. Motor vehicle component as claimed in claim 1, wherein the movable component is one of an adjustable striker, a locking clip and a latch of a closing aid of a motor vehicle door lock.

21. Motor vehicle component as claimed in claim 1, wherein the movable component is the driving element of a motor vehicle door or hatch.

* * * * *